Patented Apr. 1, 1947

2,418,441

UNITED STATES PATENT OFFICE 2,418,441

HYDROGENATION OF ORGANIC COMPOUNDS USING TITANIUM HYDRIDE AS A CATALYST

Gerald M. Whitman, Claymont, Del., assignor to E. I. du Pont de Nemours & Company, Wilmington, Del., a corporation of Delaware No Drawing. Application November 1, 1944, Serial No. 561,501

5 Claims. (Cl. 260—464)

This invention relates to titanium hydride and more particularly to its use as a hydrogenation catalyst.

An object of this invention is to provide a new method for hydrogenating certain unsaturated organic compounds. A further object is the provision of a new method for the selective hydrogenation of acetylene compounds to olefinic compounds. A still further object is the provision of a new method for hydrogenating carbon-nitrogen triple bonds. A still further object is to provide a new method of hydrogenating nitrogen-oxygen double bonds. Additional objects will become apparent from an examination of the following description and claims.

These and other objects and advantages are accomplished according to the herein described invention which broadly comprises heating with hydrogen in the presence of a catalytic amount of titanium hydride an unsaturated organic compound of the group consisting of organic compounds containing a triple bond between carbon and an element having an atomic weight within the range of from 12 to 15 and organic compounds containing a double bond between nitrogen and oxygen.

One preferred embodiment of this invention comprises heating an acetylenic compound with hydrogen in the presence of a catalytic amount of titanium hydride at a temperature within the range of 100° C. to 225° C. under a pressure of more than 1000 lbs. per square inch.

Another preferred embodiment of this invention comprises heating an organic nitrile with hydrogen in the presence of a catalytic amount of titanium hydride at a temperature within the range of 100° C. to 225° C. under a pressure of more than 1000 lbs. per square inch.

Still another preferred embodiment of this invention comprises heating an organic nitro compound with hydrogen in the presence of a catalytic amount of titanium hydride at a temperature within the range of 100° C. to 225° C. under a pressure of more than 1000 lbs. per square inch.

Various arrangements and selections of the equipment for the operation of my process are possible. In the preferred arrangement, however, a pressure reactor is charged with the titanium hydride and the compound to be reduced. The reactor is then closed, pressured with hydrogen and the reaction mixture is heated with agitation. After an amount of hydrogen corresponding to that theoretically required to effect the desired reduction has been absorbed, agitation is stopped. The reactor is then cooled, opened, and the contents are discharged. The reaction mixture is filtered to remove the catalyst and the reaction product is isolated from the filtrate by conventional means.

The following examples, in which the proportions are in parts by weight unless otherwise specified, are given for illustrative purposes and are not intended to place any restrictions on the hereindescribed invention.

Example I

A mixture of 150 parts of methylethinylcarbinol and 12.5 parts of titanium hydride catalyst is placed in a steel pressure vessel and shaken at 175° C. under 1000–2000 lbs./in.² hydrogen pressure. The shaking is stopped after approximately 1 mole of hydrogen per mole of carbinol has been absorbed. After the pressure vessel has been cooled, the product is removed and freed from catalyst by filtration. Analysis of the product for carbon, hydrogen, unsaturation and acetylenic hydrogen shows the presence of methylvinylcarbinol corresponding to 36.5% of the theoretical amount, butanol-2 corresponding to 26% of the theoretical amount and methylethinylcarbinol corresponding to 37.5% of the starting material. This analysis is confirmed by distillation and examination of the individual fractions.

Example II

A mixture of 51 parts of phenylacetylene, 100 parts of cyclohexane and 5 parts of titanium hydride catalyst is placed in an autoclave and shaken under 1000–2000 lbs./in.² hydrogen pressure at 175° C. until slightly less than 1 mole of hydrogen per mole of phenylacetylene has been absorbed. At this point, the rate of absorption of hydrogen decreases noticeably. The product is filtered from the catalyst, the cyclohexane removed by distillation and the residue fractionated under reduced pressure. At 85° C. under 150 mm. pressure a product is obtained which is shown by analysis for carbon, hydrogen, unsaturation and acetylenic hydrogen to contain styrene corresponding to 32% of the theoretical amount; ethylbenzene corresponding to 15% of the theoretical amount and phenylacetylene corresponding to 2.3% of the starting material. The residue from the distillation, which corresponds to 28 parts, is a viscous liquid which slowly sets to a solid which is apparently polystyrene.

Example III

A mixture of 75 parts of nitrobenzene, 75 parts of ethanol and 7.5 parts of titanium hydride catalyst is shaken at 165° C. under a hydrogen pressure of 1000–2000 lbs./in.² Slightly less than 3 moles of hydrogen per mole of nitrobenzene is absorbed. Distillation of the filtered product gives aniline corresponding to 92% conversion of the nitrobenzene used. There is a small distillation residue having the odor of nitrobenzene.

Example IV

A mixture of 60 parts of nitrobenzene, 90 parts of isopropanol, 10 parts of 50% potassium hydroxide solution and 10 parts of titanium hydride catalyst is shaken in an autoclave at 150° C. under 1000–2000 lbs./in.² hydrogen pressure. Slightly less than 2 moles of hydrogen per mole of nitrobenzene is absorbed. The product after filtration to remove the catalyst is diluted with water, cooled in ice, and filtered to give azobenzene corresponding to 31% of the theoretical amount. The filtrate is cooled to 0° C., treated with 100 parts of concentrated hydrochloric acid with vigorous stirring and allowed to stand overnight. Addition of sodium chloride causes no precipitate to form, indicating the absence of appreciable amounts of hydrazobenzene in the product. The mixture is made alkaline and steam distilled, and aniline corresponding to 68% of the theoretical yield is collected in the distillate.

Example V

A mixture of 100 parts of adiponitrile, 75 parts of methanol and 10 parts of titanium hydride catalyst is shaken at 100–200° C. under 2000 lbs./in.² hydrogen pressure. Absorption of hydrogen occurs slowly during this period. The product is washed from the vessel with methanol, the catalyst is removed by filtration and the mixture fractionated after addition of about 75 parts of water. The distillation fraction contains epsilon-aminocapronitrile and hexamethyleneimine in approximately 7:1 weight ratio, together with some unchanged adiponitrile.

Although this invention has been illustrated with particular reference to the hydrogenation of methylethinylcarbinol, phenylacetylene, nitrobenzene and adiponitrile, it is contemplated that titanium hydride is applicable as a catalyst for the hydrogenation of any organic compound containing either carbon-to-carbon triple bonds, carbon-to-nitrogen triple bonds or nitrogen-to-oxygen double bonds as, for example, acetylene, monovinyl acetylene, alkyl and aryl derivatives of these, acetylenic alcohols, e. g., methylethinylcarbinol, dimethylethinylcarbinol, dimethylvinylethinylcarbinol, nitrobenzene and nitrotoluene and other aromatic nitro compounds, nitroanisole, glutaronitrile, adiponitrile, acetonitrile, propionitrile, valeronitrile, sebaconitrile and the like.

Although in the examples there have been used certain conditions of temperature, pressure, concentration, pH of reaction medium, duration of reaction, etc., it is to be understood that these values may be varied somewhat within the scope of the invention since the conditions of each experiment are determined by the particular compound being treated.

When it is desired to prepare amines from the corresponding nitro compounds, it is desirable to operate in neutral solution or in solutions which are only slightly acidic or basic. When the azo compounds are desired, it is desirable to operate in solutions containing an alkali metal hydroxide. In general the process of this invention is applicable at temperatures within the range of from 75° C. to 300° C. However, on account of the superior yields thereby obtained, I prefer to effect said hydrogenation at a temperature within the range of from 100° C. to 225° C.

It is advisable to use pressures in excess of 1000 lbs./sq. in. since under such conditions a practical rate of reaction is obtained. The process, however, can be operated employing pressures which may be as low as 100 lbs./sq. in. and as high as permitted by the limitations of the equipment employed.

The process may be carried out in the absence of a solvent but is generally operated in the presence of an inert organic solvent such as an alcohol, ether, or hydrocarbon. As examples of specific organic solvents one may use methanol, ethanol, propanol, isopropanol, dioxane, toluene or cyclohexane.

As hereinbefore stated, titanium hydride is the catalyst employed in my novel process. Said catalyst may, for instance, be any good grade of commercial titanium hydride, such as granular commercial titanium hydride which will pass through a 300 mesh screen. Said titanium hydride can be made in several ways as, for example, by subjecting an active form of titanium to the action of hydrogen or by reducing a suitable titanium compound with either an alkali metal hydride or an alkaline earth metal hydride.

In the practice of this invention the amount of titanium hydride employed may vary from about 0.1% to about 20% by weight of the compound being hydrogenated. Generally, however, the amount used is within the range of from 1% to 10% by weight of the compound being hydrogenated, since optimum yields of hydrogenated product are obtained when the amount of catalyst employed is within this range. Satisfactory hydrogenation rates and conversions are obtained employing the titanium hydride in an unsupported form. If desired, however, the titanium hydride may be supported on a carrier, e. g., charcoal, silica gel, kieselguhr and the like.

The invention is used in the preparation of compounds containing olefin double bonds, from those containing acetylenic linkages; in the production of azo and amino compounds from nitro compounds; and in the production of amines from nitriles. These are valuable products having many industrial uses either as such or as intermediates in the manufacture of other important products.

This invention offers many advantages since it provides a catalyst which is to a large extent selective of reducing acetylenic linkages to olefin linkages, nitro compounds to azo compounds and amines, and nitriles to amines.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. An improved hydrogenation process which comprises heating with hydrogen, in the presence of catalytic amounts of titanium hydride, an unsaturated organic compound containing a triple bond between carbon and an element having an atomic weight within the range of from 12 to 15.

2. The process for obtaining an amine which comprises heating an organic nitrile with hydrogen in the presence of a catalytic amount of titanium hydride at a temperature within the range of from 75° C. to 300° C. under a pressure of at least 100 lbs. per square inch.

3. The process for obtaining epsilon-aminocapronitrile which comprises heating adiponitrile in an inert organic solvent with hydrogen at a temperature within the range of from 100° C. to 225° C. under a pressure of more than 1000 lbs. per square inch, said heating being effected in the presence of titanium hydride in an amount within the range of from 1% to 10% of the weight of said adiponitrile.

4. The process for obtaining an organic compound containing a double bond between acyclic carbon atoms which comprises heating an organic compound containing a triple bond between carbon atoms with hydrogen in the presence of a catalytic amount of titanium hydride at a temperature within the range of from 75° C. to 300° C. under a pressure of at least 100 lbs. per square inch.

5. The process for obtaining styrene which comprises heating phenylacetylene in an inert organic solvent with hydrogen at a temperature within the range of from 100° C. to 225° C., under a pressure of more than 1000 lbs. per square inch, said heating being effected in the presence of titanium hydride in an amount within the range of from 1% to 10% of the weight of said phenylacetylene.

GERALD M. WHITMAN.

REFERENCES CITED

The following references are of record in the file of this patent:

UNITED STATES PATENTS

| Number | Name | Date |
| --- | --- | --- |
| 2,208,598 | Rigby | July 23, 1940 |
| 2,225,059 | Lazier | Dec. 17, 1940 |
| 2,292,949 | Lazier | Aug. 11, 1942 |
| 2,160,578 | Schmidt | May 3, 1939 |

FOREIGN PATENTS

| Number | Country | Date |
| --- | --- | --- |
| 297,212 | British | Sept. 20, 1928 |

OTHER REFERENCES

Berkman et al., "Catalysis" (1940), p. 758 (abst. of article by Etzel, Jour. Phys. Chem., vol. 32, pp. 852–860).

Ellis, "Hydrogenation of Org. Substances" (1930), page 21.

Ellis, "Hydrogenation of Oils" (1919), pp. 269–271.